United States Patent [19]

Fraser

[11] Patent Number: 4,896,408
[45] Date of Patent: Jan. 30, 1990

[54] METHOD OF REPAIRING TURBINE BLADES

[75] Inventor: Michael J. Fraser, Broughton Hackett, England

[73] Assignee: Refurbished Turbine Components Limited, Droitwich, England

[21] Appl. No.: 229,141

[22] Filed: Aug. 5, 1988

[30] Foreign Application Priority Data

Aug. 8, 1987 [GB] United Kingdom ............... 8718837

[51] Int. Cl.⁴ .............................................. B21K 3/04
[52] U.S. Cl. .............................. 29/156.8 B; 29/402.08; 29/402.13; 29/402.16
[58] Field of Search .................... 29/156.8 R, 156.8 B, 29/156.8 P, 402.08, 402.13, 402.16, 402.18

[56] References Cited

U.S. PATENT DOCUMENTS

| | | | |
|---|---|---|---|
| 3,230,616 | 1/1966 | Janssen | 29/402.16 X |
| 4,141,124 | 2/1979 | Ryan | 29/156.8 R X |
| 4,285,108 | 8/1981 | Arrigoni | 29/156.8 B |
| 4,575,911 | 3/1986 | Laszlo | 29/156.8 B |

Primary Examiner—Timothy V. Eley
Attorney, Agent, or Firm—Parmelee, Miller, Welsh & Kratz

[57] ABSTRACT

A method of repairing a turbine blade of the type wherein each of an array of blades has a tennon extending into a shroud passing around the outside of the blade, the repair being to the area of the blade in which the tennon is situated and comprises the steps of removing at least a part of the shroud, removing the damaged tennon and a part of the blade on which the tennon is situated, manufacturing a new tennon and blade part and locating that new part to at least one adjacent blade in a proper position while the new tennon and blade part is welded to the remaining part of the blade.

13 Claims, 6 Drawing Sheets

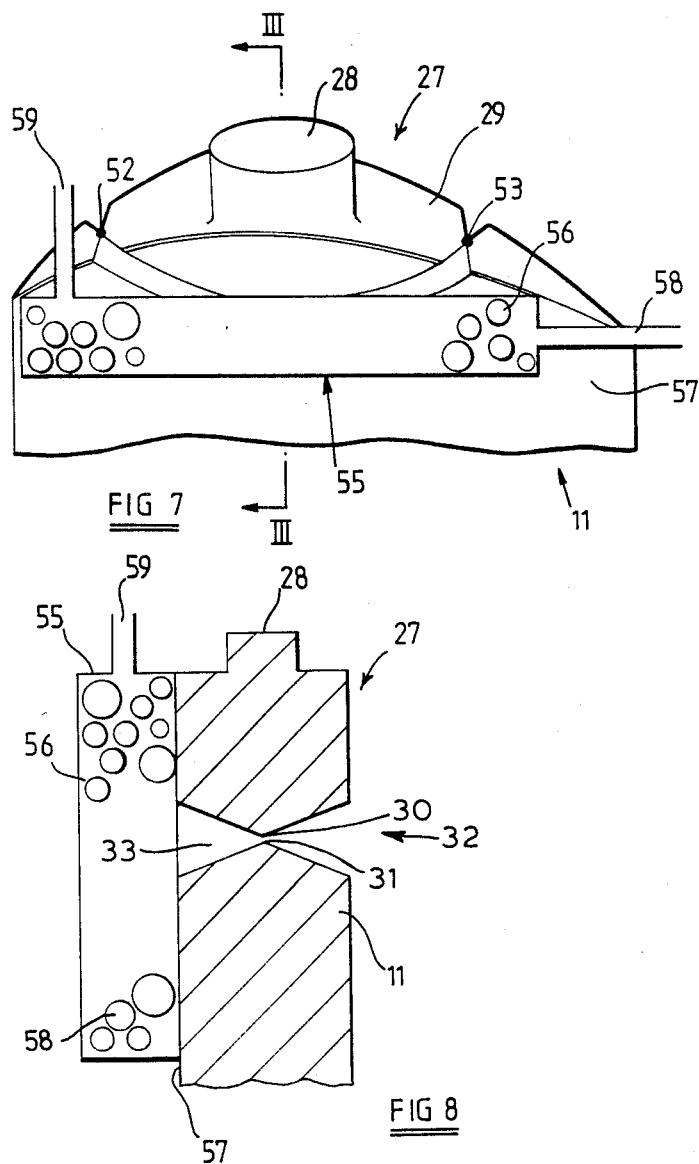

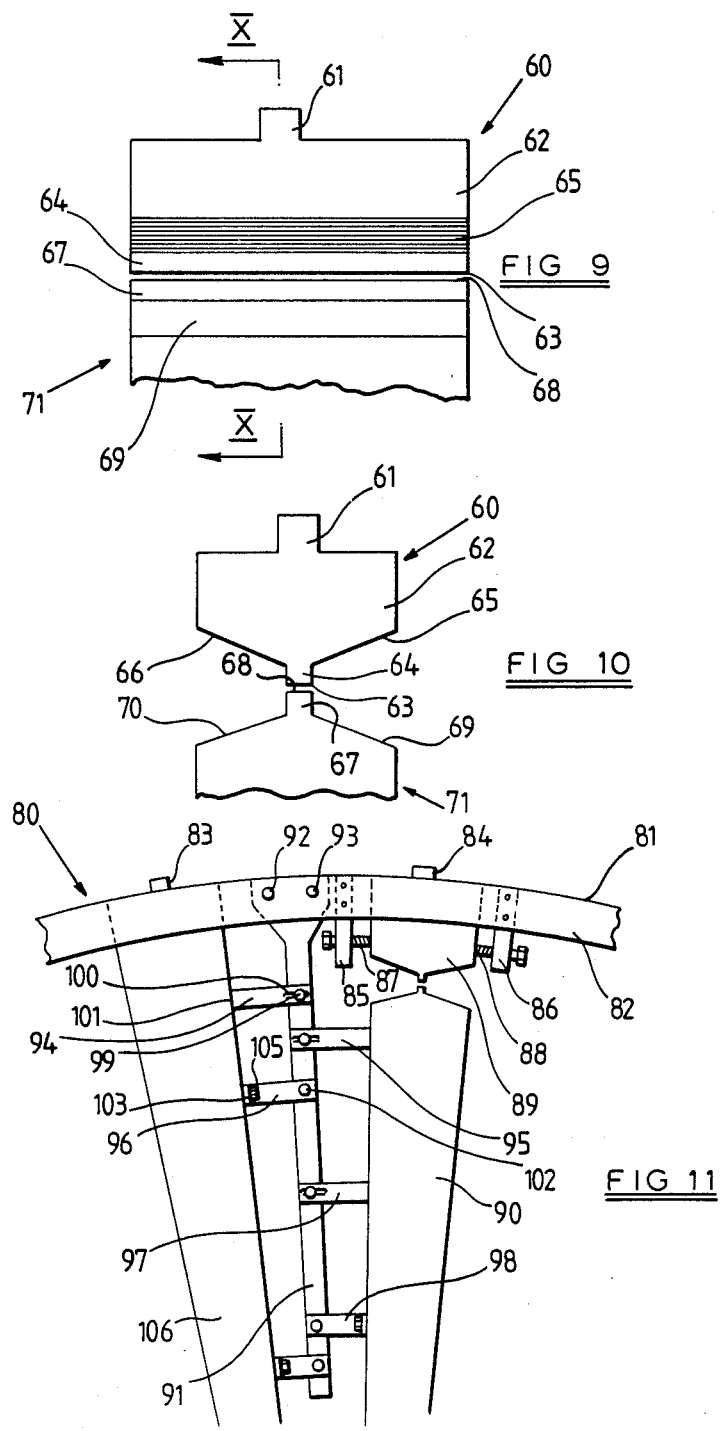

METHOD OF REPAIRING TURBINE BLADES

BACKGROUND OF THE INVENTION

1. Field of the Invention

The present invention relates to a method of repairing turbine blades of the type in which an array of turbine blades, arranged in a rotor for example, has a shroud extending around the outer ends of the blades, each blade being provided with at least one tennon adapted to co-operate with the shroud in a manner such that each blade is secured to the shroud.

Turbine blades of the type described which may be used for example in steam turbines are subjected to a harsh environment which after a while causes wear and damage to the blades.

The outer end of the turbine blade in a rotor assembly is the part which has the greatest linear speed in use and hence is the part that is most prone to damage, in particular erosion. Erosion generally occurs because of contact between the turbine blades and particles carried by the steam and also because of contact with the steam itself.

At the high pressure end of the steam turbine, for example, blades are generally subjected to damage from particles of solid matter carried by the steam due to contact between the blades and the particles.

At the low pressure end of the turbine the steam is at a lower temperature having been cooled during passage through the turbine and water condenses therefrom more readily. The steam is therefore wetter, and the transfer of energy by impact on the turbine blades of the steam is greater at the low pressure end of the turbine than it is at the high pressure end.

It is often the area of the blade attached to the shroud, which attachment usually comprises one or more tennons extending substantially radially outwardly from each blade, which are subjected to most wear. The or each tennon from each blade extends into apertures or recesses in the shroud and is affixed thereto by, for example, peening over of the outer end of the tennon.

Replacements of shrouds in turbines is not an uncommon repair procedure. However, the shroud itself is a relatively simple article which can easily be replaced but wear to the end of the turbine blades, and in particular the tennons, causes much greater problems. When wear is considerable, it is necessary to re-build the tennon.

One established repair method involves the building up of a tennon by a welding process followed by machining to reform the tennon to its correct shape so that it may once again be located in a recess or aperture in the shroud.

Such a method of repair has not been found to be entirely satisfactory since the tennon built up by welding in such a manner is primarily of cast material which has inherrent weaknesses and in use can suffer premature failure and in all events gives rise to an unpredictable life span.

Disclosure of the Prior Art

British patent specification No. 2,091,140B proposes a solution to the above problem of performing a turbine blade tennon with a root part, which root part is subsequently attached to the blade by a welding or brazing operation. The root part is preferably of elongate form and is of a shape so that it may key-in to a performed slot in the blade itself so as to enable proper location of the tennon on the blade.

Whereas such a method of repair does overcome many of the problems of building up worn tennons by welding, the machining of the slot to receive the new tennon has to be very accurate which may considerably increase the time necessary to repair a turbine blade and involve the services of specialised persons.

SUMMARY OF THE INVENTION

It is an object of the present invention to provide a new or improved method of repairing a turbine blade of the type described.

According to one aspect of the present invention, we provide a method of repairing a turbine blade of the type present in a turbine blade array in which a plurality of such blades are attached to a circumferential shroud, each blade having at least one tennon which extends into an aperture such that each blade is secured to the shroud, said method of repair comprising the steps of:

(a) forming a new part which comprises a new tennon and at least an end part of the turbine blade;

(b) removing the shroud from the end of the blade to be repaired and from at least one adjacent blade;

(c) removing the old tennon and in addition a part of the turbine blade;

(d) providing location means adapted to:
 (i) locate on said new tennon and blade part;
 (ii) locate with at least one adjacent blade in said array;

(e) locating said locating means on the new tennon and blade part and on at least one adjacent blade to accurately locate said new tennon and blade part in a predetermined desired position;

(f) securing said new tennon and blade part to the turbine blade being repaired while the new tennon and blade part is being located by said location means.

Preferably, the new tennon and blade part is secured in its proper located position in a temporary manner, while located by said locating means, and wherein after said temporary securement said locating means is removed as the new tennon and blade part is properly secured by brazing or welding to said blade.

Preferably, said locating means has an edge region which locates on the one side of one or more turbine blades and at least one aperture or recess for each turbine blade with which said locating means locates to receive a respective tennon from each said blade.

Conveniently, the locating means may comprises a channel member having two spaced edge regions adapted to locate on respective opposite sides of a turbine blade, between which edge regions are provided one or more apertures to locate with one or more tennons extending from each blade.

Conveniently, said repair method may comprise the additional step of removing only some of the damaged tennons and blade parts so as to leave an existing tennon or tennons by means of which said locating means may accurately locate the new tennon and blade parts.

The new tennon and blade part may be made from any suitable material and can if desired be made from a material having beneficial wear properties so as to further prolong the life of the turbine blade.

It is envisaged that the tennon and blade part may be made from a material that permits of peening of the tennon without damaging the material from which the part is made. Peening of the very hard material may cause cracks and/or other damage. The part may therefore be of a more maleable material than the remainder of the blade and/or the blade and tennon part may be made from more than one material but afforded together in a composite part under controlled conditions.

As aforementioned, conveniently the new tennon and blade part is "tacked" into its correct position while being located by the locating means, which locating means may subsequently be removed. After removal of the locating means, access to the site for welding or brazing the new tennon and blade part to the existing blade is greatly improved. Furthermore, the position of the weld site enables one side of the blade to have affixed thereto a chill to absorb heat generated in the welding or brazing operation which chill may additionally be supplied with an inert gas, for example argon, to minimise impurities in the welding area.

Preferably, the lower edge of the new blade part and the adjoining edge of the existing blade may be shaped so as each to be of V-shape configuration extending away from a central alignment surface which permits of securing of the new tennon and blade part to the existing blade from both sides of the blade.

The repair method of the present invention provides very considerable advantages. The provision of a new blade part in addition to the new tennon ensures that the area of weld between the new part and the existing blade is considerably larger than if just a new tennon was provided, thus spreading the load that occurs in use over a much greater area.

The repair step also moves the area of cast material, i.e. welding metal away from the point of highest stress at the root of the tennon itself, furthermore since the repair step involves the application of considerable thermal energy, the blade may be adversely affected by the application of such heat and the repair method of the present invention moves the heat affected zone away from the position which, in use of the blade, is subject to high stress.

Since the tennon and blade part are preformed, apart from a small amount of machining, for example grinding to remove excess weld material after the repair has taken place, no further machining is required thus avoiding any complicated machining operation to the blade in its position on a rotor.

Further benefits are gained by the performing of the tennon and blade part in that each tennon can be of consistent quality and material so that in future use of the turbine there is no reason, apart from an accident, why any of the tennons should fail earlier than others.

The repair method of the present invention readily permits of repair of tennons while the blades are still secured to the rotor and in addition, if time is of the essence, enables more than one welder to work on a rotor at the same time.

A further unexpected benefit is gained by removing a part of the existing blade in that the provision of the cut-out on blades adjacent to the one being repaired gives improved access to the repair site to enable a more satisfactory welding or brazing operation to be carried out.

Because the area of the join between the new blade part and the existing blade is considerably increased, compared with the cross-sectional area of the tennon itself, a softer or more ductile material may be used as the weld material which provides a cushion between the new tennon and blade part and existing blade while permitting the performed tennon and new blade part to be of a hard material and hence have good wear characteristics, the cushioning weld or filler material being of a nature capable to absorb shock without causing cracking or other fracture in the join area.

It is not unknown for turbine blades of a rotor for example and, in particular, for the turbine blades in a steam turbine to take up an incorrect position as soon as they are released from their set position by for example removal of, facing wires and shrouds.

It is possible that correct location of the new tennon and blade part with reference to existing tied blades may not in itself be sufficient.

It is a further object of the present invention to provide a new locating means that overcomes and reduces the problem mentioned above.

According to another aspect of the invention, said location means for a method of repair according to any one of the preceding claims, said locating means including:

1. a first part adapted to locate on a new tennon and blade part;
2. a second part adapted to co-operate with at least one adjacent turbine blade;
3. a third part adapted to locate on the part of the turbine blade being repaired while it is secured to a turbine blade array.

Preferably said location means is provided with adjustment means operative such that when said locating means is in position, locating the relative positions of a new turbine blade part relative to an adjacent turbine blade and relative to the existing blade part to which new tennon and blade part is being secured, one or more of said relative positions may be altered by operation of said adjustment means.

Preferably, the method of repair comprises the use of location means comprising:

1. a first part adapted to locate the tennon and blade part;
2. a second part adapted to co-operate with at least one adjacent turbine blade;
3. a third part adapted to locate on the part of the turbine blade being repaired while it is secured to the turbine blade array.

It is known that with some welding techniques two parts being welded together are subject to some relative movement between the two parts as a result of contraction of hot metals and it is envisaged that the new tennon and blade part may initially be located in a predetermined desired position but which position may be incorrect as regards the final desired position of the tennon.

It is necessary that while said location means is present the new tennon and blade part is firmly secured to the remaining part of the blade. After the tennon and blade part has been secured to the remaining part of the blade then a full welding operation may take place to properly secure the new part to the existing part of the blade and whereas this entails welding "passes" on either side of the blade it is expected that there will be a bending of the new part in a direction towards that side of the blade where the first full weld "pass" is carried out.

According to another aspect of the present invention, we provide a method of repairing a turbine blade of the type in which an array of turbine blades has a shroud extending around the outer ends of the blades, each blade being provided with at least one tennon adapted to co-operate with the shroud in a manner such that each blade is secured to the shroud, said method of repair comprising the steps of:

(a) forming an integral tennon and blade part;
(b) removing the old tennon and part of the blade;
(c) providing locating means adapted to:
  (i) locate on said new tennon and blade part;
  (ii) co-operate with at least one adjacent blade in said array; so as to accurately locate said new tennon and blade part in a predetermined desired position;
(d) locating the new tennon and blade part relative to an adjacent blade in a flexible manner;
(e) securing by welding said new tennon and blade part to the blade to be repaired;
(f) measuring any misalignment or distortion between the new tennon and blade part and the blade being repaired after said welding has been completed;
(g) securing a new tennon and blade part in position on the next said blade to be repaired while it is located by said location means;
(h) positioning said locating means to deliberately off-set said new tennon and blade part from its proper position, the amount of off-set being determined by the measurement taken from said previously repaired blade;
(j) securing the new tennon and blade part to the turbine blade while it is being located by said locating means;
(k) repairing said subsequent blade in an identical manner, each new tennon and blade part being off-set by said locating means by said measured amount.

After welding has been carried out it will be necessary for the blade to be heat treated and further locating means may be provided particularly in the case where the first locating means positively locates the new tennon and blade part in a position other than in its final in use position, the further locating means being adapted to locate the repaired blade in its final in use position relative to the remaining blades.

Preferably the new tennon and blade part and the remaining part of the blade to be repaired are both machined to a form whereby they each have an alignment surface adapted to abut each other to ensure correct alignment of the new tennon and blade part with the remaining part of the blade. The provision of such abutting surfaces is of considerable assistance particularly when some displacement of the new tennon and blade part and the remainder of the blade from its normal in use position is initially required to ensure that after welding the blade finishes up in a position as near as possible to its desired in use position.

Preferably said abutting surfaces are provided approximately along the centre line of the blade and the abutting surfaces may combine a relatively thin flange on both the existing blade part and the new tennon and blade part which flange is intended to be burnt through during the first weld pass.

If required a chill can be placed on one side of the blade opposite from the side where the first weld pass will take place. The chill may also be supplied with an inert gas such as Argon to minimise any impurities in the metal during the welding process.

Once the first weld has taken place there will a "seal" between one side of the blade and the other so that the supply of an inert gas to both sides of the blade during welding will no longer be required.

It is further envisaged that in a turbine rotor where there are many blades which have to be repaired, The first new tennon and blade part may be welded to a blade which is first machined to remove the old tennon blade part the welding taking place while the new tennon and blade part is only "loosely" secured in position. Any distortion or movement of the new tennon and blade part relative to the remainder of the blade and in addition any twist of other distortion imparted to the blade itself during the welding process is carefully measured so that any predetermined offset from the in use position which would be required to compensate for such movement may be accommodated by the locating means. All further tennon and blade parts can then be secured to their respective blades initially in an "offset" position so that they will finish up after the welding process has been carried out in as near a correct position as possible.

BRIEF DESCRIPTION OF THE DRAWINGS

The invention will now be described in more detail by way of example only with reference to the accompanying drawings, wherein:

FIG. 7 illustrates the use of an inert gas supplied chill during the repair step;

FIG. 8 is a sectional view on the line VIII—VIII of the blade part and chill shown in FIG. 7;

FIG. 9 is a side elevation of an end part of the turbine blade with a part root and a new tennon and blade part in face-to-face relationship;

FIG. 10 is a sectional view on the line X—X shown in FIG. 9;

FIG. 11 is a diagrammatic view of a second embodiment of location means.

DESCRIPTION OF THE PREFERRED EMBODIMENTS

Figure 1:
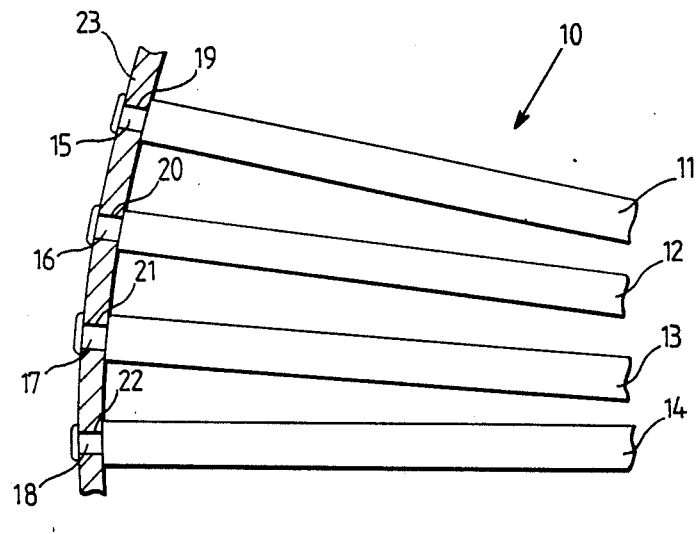
FIG. 1 is a diagrammatic view illustrating the securing of turbine blades to a shroud.
Figure 2:
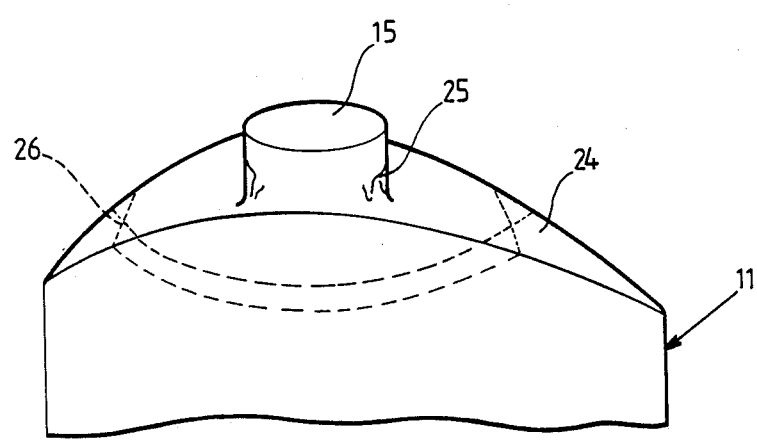
FIG. 2 is a view of one of the turbine blades shown in FIG. 1.

Referring first to FIGS. 1 and 2, part of a rotor is generally indicated at 10 in FIG. 1 and comprises turbine blades 11, 12, 13 and 14.

The outer ends of each of the blades are provided with respective tennons 15 to 18 which extend through apertures 19, 20, 21 and 22 in a shroud 23 and are each peened over so as to firmly secure the shroud 23 to the ends of the blades 11–14.

In use, it is the tennon itself which is subject to considerable wear, particularly in that part where the tennon joins the remainder of the blade i.e. the "root" of the tennon.

Referring now in addition to FIG. 2, an end portion of a turbine blade, for example blade 11, is shown. The blade has an end surface 24 which abuts against the shroud 23 and by way of example damage is shown at 25 to the tennon 15.

To effect the repair process a portion of the shroud 23 is removed, by grinding for example the ends of the tennons to remove the peened over part. The shroud may then be separated from the turbine blades, or at least a section thereof, and a blade to be repaired has a portion removed, which portion includes the tennon 15, the portion being indicated by the dotted outline 26 shown in FIG. 2.

Figure 3:
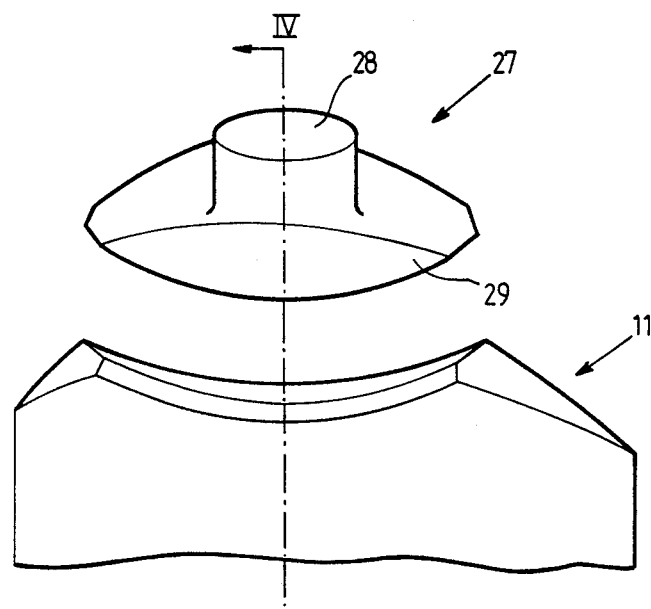
FIG. 3 is a side elevation of a turbine blade with a part removed and a new tennon and blade part in spaced relationship.

Referring now in addition to the other figures, FIG. 3 illustrates the blade 19 in which the damaged portion has been removed and a new tennon and blade part generally indicated at 27 and comprising specifically a new tennon 28 and integral blade part 29 is placed approximately in position to replace the part of the blade and original tennon that has been removed.

Figure 4:
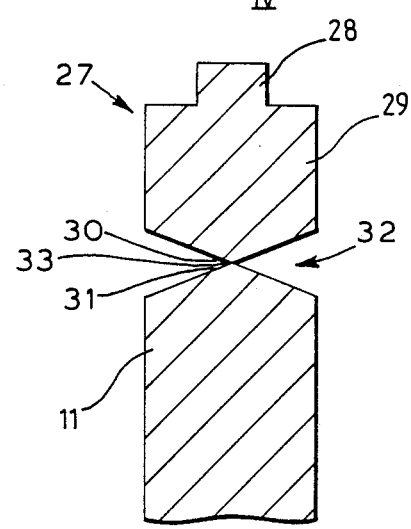
FIG. 4 is a sectional view on the line IV—IV of the blade and new tennon shown in FIG. 3.

Referring to FIG. 4 it will be noted the new part 27 has a curved lower surface which is of V-shape in cross-section to provide a lower alignment surface 30.

The blade 11 is also machined so as to be provided with a curved convex surface such surface also having a V-shape configuration and providing an aligned apex 31. The surfaces are formed so as to provide a diabolo shape so that either side of the locating surfaces 30, 31 there is a V-shaped slot 32 and 33 both of which may be filled with weld material to secure the new tennon and blade part 27 to the remainder of the blade 11.

If required the alignment surfaces other than the apex of the V may be formed with a small land and such an embodiment will be described with reference to FIGS. 9 and 10.

Figure 5:
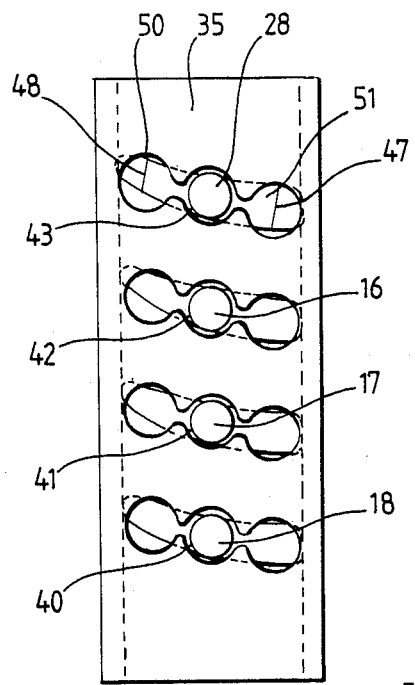
FIG. 5 illustrates one embodiment of locating means.
Figure 6:
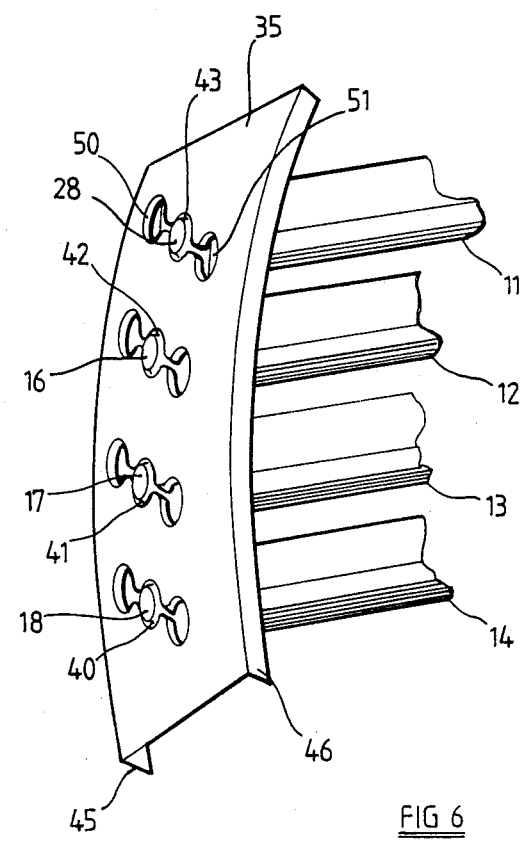
FIG. 6 is a perspective view of the locating means shown in FIG. 5.
Figure 12:
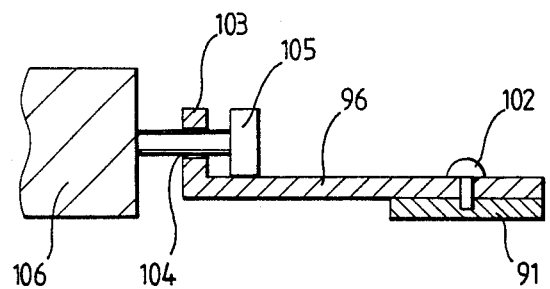
FIG. 12 is a sectional view of a bracing member shown in FIG. 11.

Referring now to FIGS. 5 and 6, there is shown once again an array of turbine blades, or at least the end parts thereof, 11, 12, 13 and 14 and for the moment it is assumed that only the blade 11 has had a part removed.

Locating means in the form of a curved channel member 35 is placed over the ends of the blades 12, 13 and 14 so that the central apertures 40, 41 and 42 locate on the tennons 18, 17 and 16 respectively.

The locating means 35 has two edge parts 45 and 46 the inner surface of which locate on opposite edges of each turbine blade.

The aperture 43 is therefore accurately placed in the position where the new tennon 28 should be positioned relative to the turbine blade 11.

The new piece 27 is located so that its tennon 28 extends through aperture 43 in locating means 35 and the remainder of the new piece 27 may by virtue of its shape and that of the blade 11 may easily be adjusted to an aligned position. When it is in its aligned position it may be fixed in said position, for example by providing a tack weld on the surface of the blade on the join lines between the old and new material shown at 47 and 48. To enable access to the join lines to provide a tack weld two further apertures 50 and 51 are provided in the locating means 35 adjacent the central aperture 43.

The next tennon may then be repaired by a similar method and once one or two tennons have been correctly located the new tennons can be used to locate further new tennon and blade parts rather than relying solely on the old tennons.

The locating means 35 may be provided with some form of locating means or clamping means such as machine screws threadedly located with the locating means or parts fixed thereto. Such screws being positioned so as to bear on the new tennon and blade part and possibly on the remainder of the blade so that the new tennon and blade may be accurately positioned in a desired position relative to the remainder of the blade. It will be appreciated that both the locating means shown in FIGS. 5 and 6 may accurately locate the new tennon and blade part, however the remainder of the blade 14, especially if the blade is long, may be far from its correct aligned position once the restraint of the old shroud has been removed.

It is envisaged therefore that the invention may provide additional locating means whereby pressure can be brought to bear upon the blade being repaired to maintain it in a desired position.

It may also be that because of the nature of the repair which requires input of considerable heat once the locating means 35 is removed and the repair step fully carried out, the blade may take up a position somewhat removed from the desired in use position.

It is envisaged therefore that the locating means may at least initially purposely locate the new tennon and blade part and the remainder of the blade in a position different from the position in which the blade will have its normal "in use" position such location may compensate for respective movement of the blade during the repair step. Further locating means may be provided which may be positioned over the tennons to accurately align all the blades in their "in use" position while a heat treatment process is carried out.

This will substantially reduce any stress in a blade restrained in any "in use" position different from the position which it may naturally wish to adopt.

Referring now in addition to FIGS. 7 and 8, one method of firmly securing the tennon and blade part to the existing blade will be described in more detail.

A new part 27 has been affixed to the blade 11 by a tack weld at 52 and 53 and is in the correct position. The shape of the new part 27 and the shaped end of the blade 11 is such that two V-shaped gaps 32 and 33 are present on each side of the blade (the size of the gap being exaggerated in the drawing).

A chill which may comprise a box-like structure 55 filled with heat conducting particles, for example copper balls 56, of varying sizes is affixed to the surface 57 of blade 11 and if desired an inert gas, for example argon, may be supplied to the chill through inlet 58, the chill may have an outlet 59 which may be a restricted outlet thus ensuring that a quantity of the argon passes through the V-shape slot 33. Alternatively an inert gas may be supplied to the blade 11 through wire wool which is held against the blade.

The part 27 may then be permanently secured to the blade 11 by a welding or brazing operation, the weld or filler material starting at the abutting surfaces 30 and 31.

A grinding operation can then take place to remove excess material and return the blade to its proper form. The chill may then be removed and once a similar repair step has taken place to all the blades that require repair, a new shroud may be secured in position, the tennons being peened over to secure the shroud to the blades.

Referring now to FIGS. 9 and 10 an alternative shape of a new tennon and blade part is shown. In the embodiment shown the new tennon and blade part, generally indicated at 60, comprises a tennon 61 and a blade part 62, the lower edge of the blade part 62 having a straight edge 63 rather than the curved edge provided on the other illustrated embodiment. The straight edge 63 forms the lower surface of a small land 64 which is provided on the apex of the V-shaped surface formed by the inclined surface parts 65 and 66.

The blade part 71 is formed with a land 67 having an upper surface 68 and inclined surface parts 69 and 70.

The new part 60 may be located relatively to adjacent blade or blades by location means as shown in FIGS. 5 and 6 or variations thereof such as the location means illustrated in FIG. 11.

The alignment surfaces 63 and 68 on the new blade part 60 and on the blade 71 respectively are used to align the new part 60 with the remainder of the blade 71.

A chill may be provided on one side of the new part 60 and blade 71. The chill may be provided with an inert gas such as argon and a weld "pass" may take place on the other side of the blade. The lands 64 and 67 may in practice be very thin for example 1 mm or less and the lands will be completely burnt through during the weld "pass". Since the welding tool will also be provided with a supply of inert gas the area surrounding the weld is thereby maintained free from gases which may cause contamination to the weld metal.

As soon as the first weld "pass" has taken place an impervious barrir will be formed thus it will be no longer be required to provide the chill with inert gas and weld "passes" may be carried out on each side alternately.

Once the welding has been completed the repaired blade is subjected to a grinding operation to remove excess material on the tennon and blade from the welding operation. Heat treatment steps will then be carried out and it is envisaged that such heat treatment steps will preferably be carried out by the blades in a restrained position. The restraining means may be location means that have been already provided to locate the tennon in a predetermined position. Alternatively, different location means may be provided since it may have been desired to locate the new tennon and blade part in a position slightly remote from its normal in use position during the initial part of the repair step to compensate for expected movement of the blade and new tennon and blade part and that the location means used during the heat treatment may be such that the new tennon and blade part and remainder of the blade to which it is now firmly secured is located in its proper in use position so that if any pressure is necessary to retain the blade in that position the heat treatment process eliminates or substantially reduces any such stress in the blade due to such pressure.

Referring now in addition to FIG. 11 an alternative location means is provided the location means being provided with adjustment means and in addition means enabling careful alignment of the new tennon and blade part with the remaining part of the blade to which it is to be secured and positioning of the remaining part of the blade relative to at least one adjacent blade in the array.

The locating means generally indicated at 80 is a channel-like member similar to the location means as afore described.

The location means 80 comprises a central part 81 having flanges, each side one of which can be seen at 82. The central part 81 is provided with apertures through which tennons such as the tennon shown at 83 and 84 may extend to locate the blades in a desired position. Afixed to the flange 82 are a pair of bracket members 85 and 86 which may extend right across the channel member and each be provided with a plurality of threaded members such as machine screws or the like two of which are shown at 87 and 88.

The machine screws 87 and 88 may be used to clamp or otherwise bear on the new tennon and blade part shown at 89 to locate it in a desired position. Since the desired position of the new tennon and blade part 89 may cause it to be out of alignment with the remainder of blade 90 further location means may be provided and is shown as an elongate member 91 secured by fasteners 92 and 93 secured to the flange 82 of the channel-like member 80. The elongate member 91 carrying a plurality of bracing members 94, 95, 96, 97 and 98.

In order to provide the range of adjustment different lengths of bracing member may be provided or alternatively adjustment means may be provided on the bracing member itself.

Referring to the bracing member 94, it is shown secured to the elongate member 91 by a set screw 99 which is threaddedly engaged with the elongate member 91. The bracing member 94 is provided with an elongated hole 100 thereby allowing some adjustment between the elongate member and the bracing member 94. The distance between the outer end 101 of the bracing member 94 and the elongate member 91 may therefore be adjusted by different positioning of the bracing member 94 relative to the elongate member 91 and subsequent tightening of the set screw 99.

An alternative form of adjustment is shown on the bracing member 96. In this case the bracing member 96 is provided with a round hole through which set screw 102 passes to firmly secure the bracing member 95 to elongate member 91.

The outer end of the bracing member 95 is provided with a flange 103 in which is provided a threaded through bore 104 in which is engaged a threaded member 105. Adjustment of the threaded member 105 causes the end of the threaded member 105 to bear on blade 106 and adjustment may be provided by rotating the threaded member 105 in the threaded through bore 104.

By means of the various embodiments of adjustable bracing member described the elongate member 91 may throughout its length accurately locate the blade 90 to be repaired relative to an adjacent blade 106.

It will be appreciated that the above described methods of adjustment are examples only and any suitable adjustment means may be provided. It is further envisaged that rather than having an elongate member 91 bracing members or wedge members may be provided between adjacent blades 90 and 106 so that once the new tennon and blade part 89 has been accurately located by locating means in a desired position the blade 90 by means of such wedges and bracing members bearing on adjacent blades may be brought into correct alignment with the new tennon and blade part 89 prior to securing thereto.

The locating means as described with reference to FIG. 11 enables compensation in the positioning of the new tennon and blade part and the remaining part of the blade to be made for any twist or deformation that is expected to occur during the repair process.

It can therefore be assured that once the extent of such deformation, twist or other movement is known the positioning of the new tennon and blade part in a desired position will ensure that at the end of the repair process the blade is as near as possible in a correct "in use" position and once properly located by further locating means during the heat treatment process little or no restraint is necessary to maintain the blade in such position. This ensure that once the new shroud is attached the blade is not in any unduly stressed state.

It is further envisaged that the blade may be subjected to heat treatment both before and/or during and/or after the repair step so as to respectively condition the blade for accepting the high temperature involved during the welding or brazing process, continuing heat during the repair step to reduce thermal shock and an excessive thermal gradient in the blade and post repair heat to provide stress relieving treatment.

It will be appreciated that the example of repair above described is an example of many different ways of accomplishing the method of the present invention.

I claim:

1. A method of repairing a turbine blade of the type present in a turbine blade array in which a plurality of such blades are attached to a circumferential shroud, each blade having at least one tennon which extends into an aperture such that each blade is secured to the shroud, said method of repair comprising the steps of:
   (a) forming a new part which comprises a new tennon and at least an end part of a turbine blade;
   (b) removing the shroud from the end of the blade to be repaired and from at least one adjacent blade;
   (c) removing the old tennon and in addition a part of the turbine blade;
   (d) providing location means adapted to:
      (i) locate on said new tennon and blade part;
      (ii) locate with at least one adjacent blade in said array;
   (e) locating said locating means on the new tennon and blade part and on at least one adjacent blade to accurately locate said new tennon and blade part in a predetermined desired position;
   (f) securing said new tennon and blade part to the turbine blade being repaired while the new tennon and blade part is being located by said location means.

2. A method of repair according to claim 1 and comprising the additional steps of:
   (a) securing said new tennon and blade part to the turbine blade being repaired while the new tennon and blade part is being located by said location means in a temporary manner;
   (b) removing said locating means from said new tennon and blade part and from said one adjacent blade; and
   (c) securing in a proper manner said new tennon and blade part to the blade by brazing or welding.

3. A method of repair according to claim 1 or claim 2 wherein the locating means is provided with an edge region, said edge region being adapted to locate on one side of the new tennon and blade part and on one side of at least one adjacent blade and wherein said locating means is also provided with at least one aperture or recess for said new tennon and blade part and for said at least one adjacent blade to receive and locate the tennon from said new tennon and blade part and from the said at least one adjacent blade respectively.

4. A method of repair according to claim 3 wherein said locating means comprises a channel member and is provided with two spaced edge regions each adapted to locate on respective opposite sides of the new tennon and blade part and at least one adjacent turbine blade.

5. A method of repair according to claim 1 or claim 2 wherein the tennon and blade part is made from material different from the material from which the blade is made.

6. A method of repair according to claim 1 or claim 2 and comprising the further steps of machining a V-shape surface onto said new tennon and blade part on the edge to be attached to said blade to be repaired, the surface extending away from a central alignment surface, machining a V-shape surface on said turbine blade to be repaired, the surface extending away from a central alignment surface locating the new tennon and blade part in a position to be secured to the blade to be repaired by locating said new tennon and blade part with said locating means such that said alignment surfaces on the new tennon and blade part and on the blade to be repaired are aligned with each other.

7. A method of repair according to claim 1 or claim 2 wherein said location means comprises:
   1. a first part adapted to locate on the new tennon and blade part;
   2. a second part adapted to co-operate with at least one adjacent turbine blade;
   3. a third part adapted to locate on the part of the turbine blade being repaired while it is secured to the turbine blade array;
said method of repair including the further steps of using said location means to locate the new tennon and blade part with respect to at last one adjacent blade and with respect to the turbine blade being repaired.

8. A method of repair according to claim 1 or claim 2 wherein the location means is provided with adjustment means whereby location of the locating means on the blade to be repaired enables the new tennon and blade part to be accurately located relative to an adjacent blade in the array.

9. A method of repair according to claim 7 wherein said location means is provided with adjustment means whereby location of the locating means on a blade to be repaired enables the new tennon and blade part to be accurately located on the blade to which it is to be secured and also accurately secured relative to an adjacent blade or blades in the array.

10. A method of repair according to claim 1 or claim 2 wherein the new tennon and blade part is located by said locating means in a position off-set or out of alignment with its proper position relative to the blade being repaired to compensate for relative movement between the new tennon and blade part and the blade being repaired during securing of the new tennon and blade part to the blade during welding or brazing.

11. A method of repair according to claim 1 or claim 2 wherein a chill is provided in the area where a welding operation is to take place.

12. A method of repair according to claim 11 wherein said chill is supplied with an inert gas during at least the initial part of a welding operation to secure the new tennon and blade part to the blade being repaired.

13. A method of repairing a turbine blade of the type in which an array of turbine blades has a shroud extending around the outer ends of the blades, each blade being provided with at least one tennon adapted to co-operate with the shroud in a manner such that each blade is secured to the shroud, said method of repair comprising the steps of:
   (a) forming an integral new tennon and blade part;
   (b) removing the old tennon and part of the blade;
   (c) providing locating means adapted to:
      (i) locate on said new tennon and blade part;
      (ii) co-operate with at least one adjacent blade in said array; so as to accurately locate said new tennon and blade part in a predetermined desired position;
   (d) locating the new tennon and blade part relative to an adjacent blade in a flexible manner;
   (e) securing by welding said new tennon and blade part to the blade to be repaired;

(f) measuring any misalignment or distortion between the new tennon and blade part and the blade being repaired after said welding has been completed;

(g) securing a new tennon and blade part in position on the next said blade to be repaired while it is located by said location means;

(h) positioning said locating means to deliberately off-set said new tennon and blade part from its proper position, the amount of off-set being determined by the measurement taken from said previously repaired blade;

(j) securing the new tennon and blade part to the turbine blade while it is being located by said locating means; and (k) repairing each subsequent blade in an identical manner, each new tennon and blade part being off-set by said locating means by said measured amount.

* * * * *